United States Patent [19]

Baumgarten

[11] Patent Number: 5,122,049
[45] Date of Patent: Jun. 16, 1992

[54] EXTRUDER-CALENDER COMBINATION

[75] Inventor: Wilfried Baumgarten, Pattensen, Fed. Rep. of Germany

[73] Assignee: Paul Troester Maschinenfabrik, Hanover, Fed. Rep. of Germany

[21] Appl. No.: 788,027

[22] Filed: Nov. 5, 1991

[30] Foreign Application Priority Data

Nov. 8, 1990 [DE] Fed. Rep. of Germany ....... 4035476

[51] Int. Cl.⁵ .............................................. B29C 47/32
[52] U.S. Cl. .................................. 425/188; 264/175; 425/190; 425/194; 425/317; 425/382.4; 425/466
[58] Field of Search ........................... 264/175, 176.1; 425/188, 190, 192 R, 194, 327, 363, 374, 376.1, 382.3, 382.4, 466

[56] References Cited

U.S. PATENT DOCUMENTS

| 3,274,645 | 9/1966 | Chase | 425/376.1 |
| 3,694,120 | 9/1972 | Walton | 425/466 |
| 4,354,814 | 10/1982 | Grimminger et al. | 425/188 |
| 4,642,039 | 2/1987 | Anders | 425/188 |
| 4,963,309 | 10/1990 | Gohlisch et al. | 425/466 |

FOREIGN PATENT DOCUMENTS 2450225  5/1976  Fed. Rep. of Germany ...... 425/327

*Primary Examiner*—Jay H. Woo
*Assistant Examiner*—James P. Mackey
*Attorney, Agent, or Firm*—Robert E. Burns; Emmanuel J. Lobato

[57] ABSTRACT

An extruder has a screw rotatable in a housing and an extrusion head having an upper part bolted to the housing and a lower part hingedly connected to the housing for movement between a closed operative position and an open position. The upper part of the extrusion head is located above the screw so that the screw can be removed from the housing when the lower extrusion head part is swung to open position and without removing the upper extrusion head part from the housing. The two extrusion head parts define between them a flow passage directed toward the upper roller of a calender. A movable lip on the lower extrusion head part faces, and is spaced from, the upper calender roller to define a variable gap through which extruded material must pass before reaching the narrowest part of the gap between the calender rollers. The lip is either pivoted at an upper edge or is slidable toward and away from the upper calender roller to vary the width of the gap formed between the lip and the upper calender roller.

13 Claims, 3 Drawing Sheets

EXTRUDER-CALENDER COMBINATION

FIELD OF INVENTION

The invention relates to an extruder-calender combination with a wide extrusion head in which there is a displacement body and the outlet nozzle of which is situated above an imaginary plane which passes through the roller gap of the calender and is perpendicular to an imaginary plane which passes through the axis of the rollers, and in which, below the outlet nozzle there is arranged a lip which overlies a sector of the upper cylinder shortly in front of the roller gap.

BACKGROUND OF THE INVENTION

An extruder-calender combination of this kind has become known through DE-OS 38 06 387. In this apparatus, a thick sheet of uniform thickness is extruded from the mouthpiece of the wide extrusion head and, before it passes it through the narrowest place of the roller gap, is drawn through a not essentially larger gap with the help of one of the two calender rollers and pressed by the extrusion pressure. In this gap space between the fixed forming tool with a concave cylindrical surface and the rotating calender roller, the macro molecules of the material are alinged in a forward direction. It is thereby achieved that the extruded and in this manner aligned material is not further thinned after leaving the narrowest part of the roller gap. The products produced by this equipment have outstanding homogeneity and the property of not being reduced in width past the narrowest part of the roller gap. However, changing to other materials can make it necessary to change the active faces of the fixed forming tool with a concave cylindrical surface facing a calender roll. Also it is not possible, with this apparatus, to change the working of the material in the gap between a calender roller and the stationary forming tool.

Through U.S. Pat No. 32 74 645 it is known to make the mass distributor of an extruder-calender combination inter-changeable. Here the inter-changeable distributor is made in two parts and envelpoes a part of the upper calender roller. A working of the extrudant through the one calender roller and the opposed stationary forming tool does not here occur. As with the above mentioned apparatus, it is also necessary here to disassemble the entire extrusion head in order to change the screw.

Through DE-OS 20 04 888 there is known an interchangeable distributor which provides a variable resistance for the production of thinner or thicker sheets. With the present day requirements of versatility with respect to mixtures that are difficult to work, this construction is no longer sufficient. With this extrusion head, changing the screw is possible only after full disassembly of the extrusion head.

The mass pressure applied by the extruder depends decisively on the head resistance, thereby also the energy conversion of the screw and hence the plasticification and warning of the mixture in the extruder. The latter limits the rate of rotation of the extruder screw and thereby limits the rate of production. There has hence been an effort to carry out a small, but definite part of the homogenization and decomposition work through the rollers of the calender, thereby making it possible to drive the extruder with limited energy consumption.

DE-OS 24 50 225 uses conventional nozzel lips which are of variable length in the direction of flow in order to influence, in large steps, the kneading work effected by the rollers of the calender. It is thereby overlooked that, for example, shorter lips result in a pressure decrease in the head and thereby an essential decrease in energy exhange in the extruder, wherefore an essentially greater energy exchange in the kneading must be effected. This can result in partial overheating or squeezing action or the inclusion of air which is objectionable. Hence this principle is in practice very unfavorable because a nozzle lip change is very time and labor consuming. This system does not provide an optimal operation. Also with this extrusion head, a disassembly of the head is required when it is necessary to change the screw.

SUMMARY OF THE INVENTION

The present invention avoids the disadvantages of the state of the art. The invention is directed to the problem of attaining a simple and economical possibility of adjusting the energy conversion between the calender rolls and the interspersed mass in a simple way during operation of the apparatus. Also the extrusion head construction permits a screw change in a simple manner.

In accordance with the invention, the upper portion of the extrusion head is secured to the extruder cylinder by a flange connection, the division plane between the upper part of the extrusion head and a lower part lies on or above the upper edge of the extrusion screw and there is provided an adjustable lip which cooperates with one of the rollers of the calender to provide an adjustable gap through which the extruded material must pass.

It is hereby attained that the gap, through which the extrudant must pass after leaving the extrusion head and before reaching the narrowest part of the gap between the calender cylinders, is sufficiently long to effect in a suitable manner a working of the material. Through the adjustment of the lip during operation of the apparatus, the working of the extrudant can be altered and optimized. At the same time, the extruder screw can be removed from the extruder and replaced without demounting the upper part of the wide extrusion head.

Structurally this apparatus is very simple when the upper edge of the moveable lip in the lower part of the extruder head is formed as a cylindrical bead received in a bearing which is provided in the lower half of the wide extruder head.

It is advantageous when the bearing of the lip is covered by a sheet metal cover plate so that the extrudant, which is still under considerable pressure, is not pressed into the bearing.

It is advantageous when the cover plate comprises a spring leaf which presses the bead of the upper edge of the lip into the bearing. Thus this cover plate has, at the same time, still a second important function.

The lip in this embodiment is swingable since it is rotatable in the bearing. This is not indispensably necessary. It is also possible within the scope of the invention that the lip is slidable parallel to itself. This embodiment can have a particular advantage for the working of the extrudant when the sliding direction is radial to the roller forming the gap, since the gap width can be varied by surfaces remaining parallel to one another. It is advantageous for structural reason when a part of the lip lies in a guide. In this manner the parallel sliding of the lip can be exactly achieved.

It is advantageous when the lip is slidable through a plurality of spindles which are driven by a common drive. In this manner an exact guiding of the lip can be assured during the adjustment and while the apparatus is in operation.

Moreover, it is advantageous when the upper edge of the lip is rounded. It is thereby assured that no "dead space" is formed in which the extrudent, remaining unmoving for a long time, can harden.

BRIEF DESCRIPTION OF DRAWINGS

The essence of the invention will be further undrerstood from the following description of the embodiments shown schematically, and by way of example, in the accompanying drawings in which.

DESCRIPTION OF PREFERRED EMBODIMENTS

Figure 1:
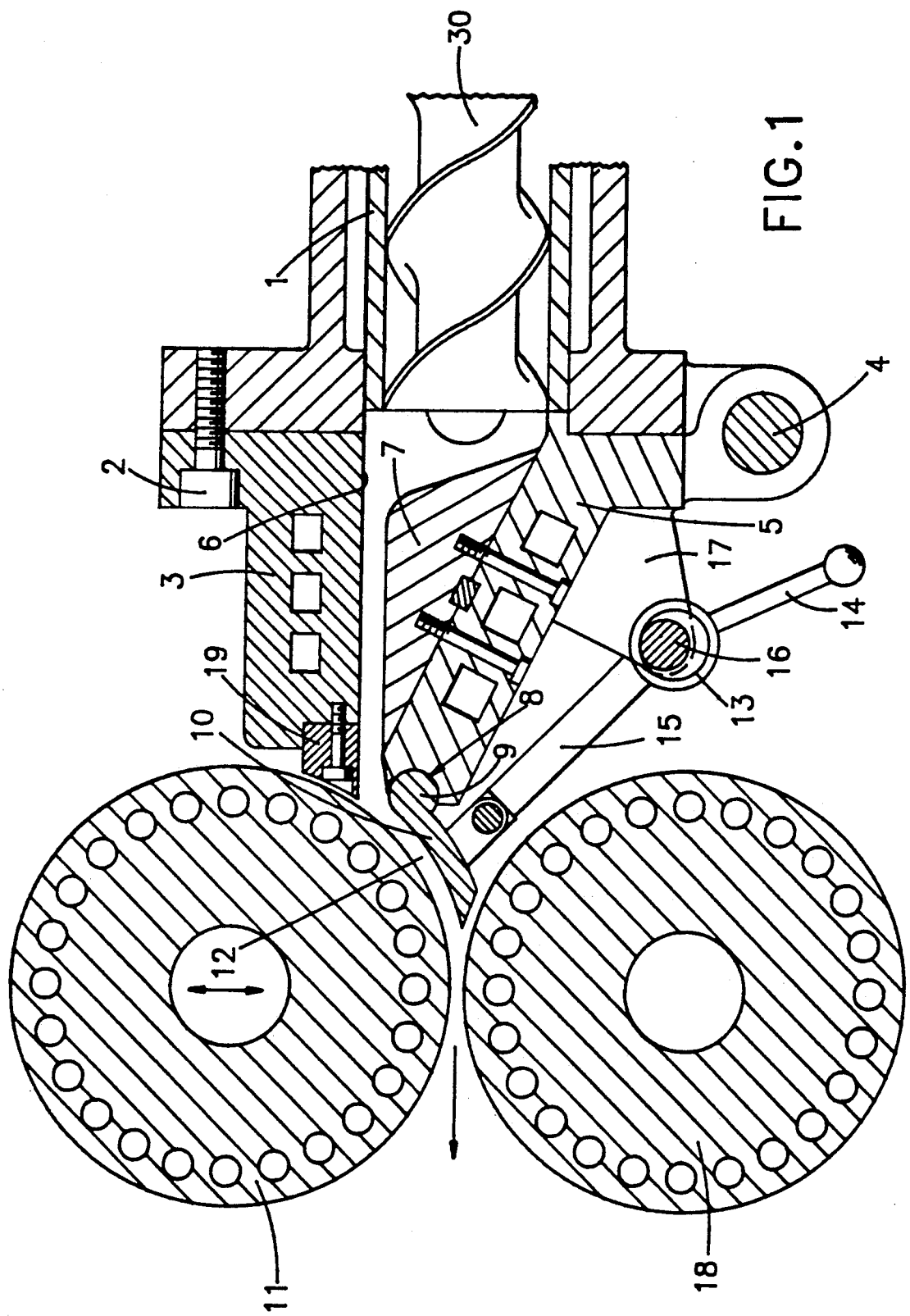
FIG. 1 is a schematic cross-section through a forward portion of the extruder head and adjacent calender rolls, a lower portion of the cylinder head being provided with a swingable lip.
Figure 2:
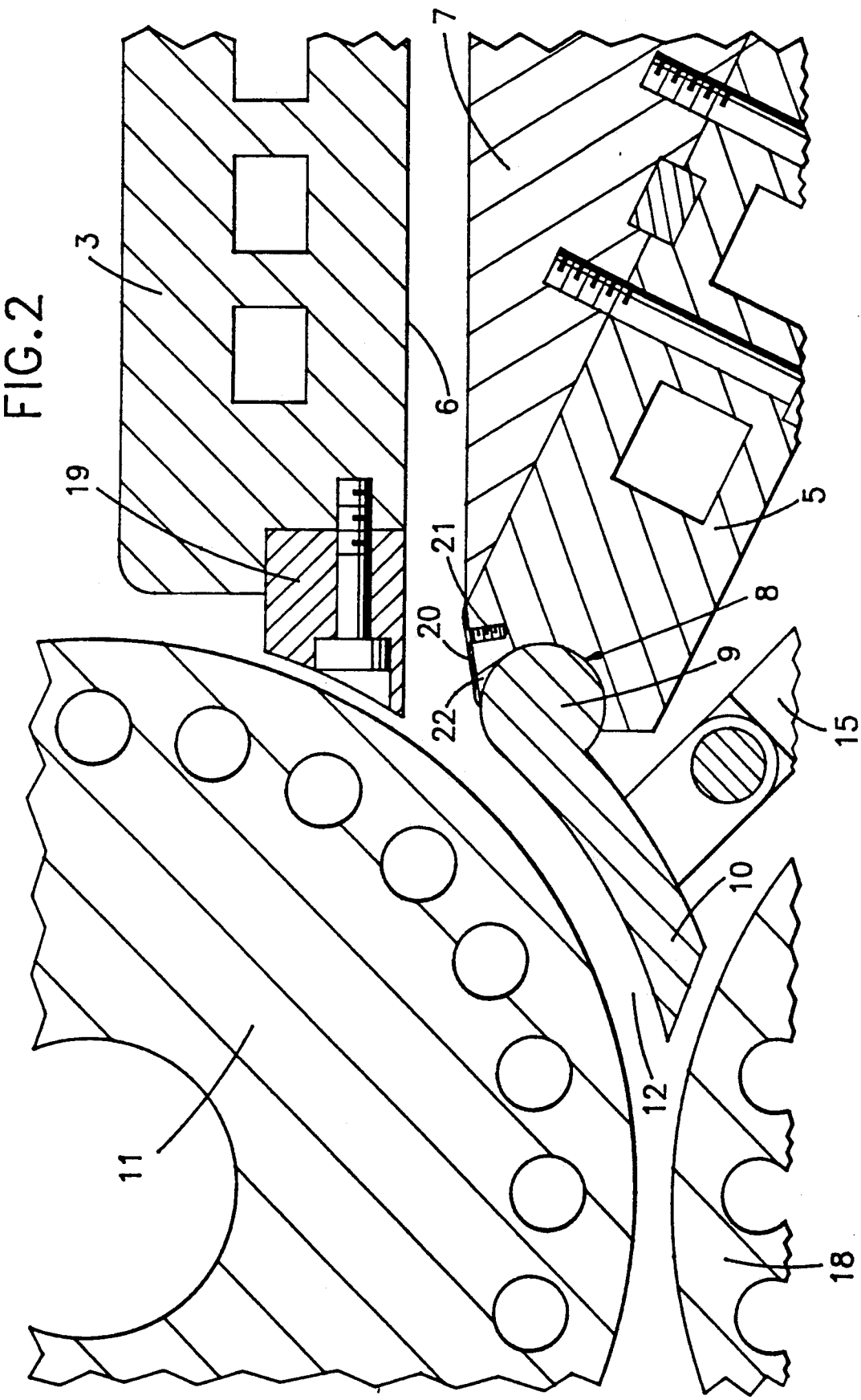
FIG. 2 is an enlarged detail of FIG. 1.

In the embodiment shown in FIGS. 1 and 2, the wide extruder head comprises an upper part 3 flange connected to the extruder cylinder 1 by means of screws 2 and a swingable lower portion 5 mounted on the extruder cylinder 1 by a bearing shaft 4 so that it can be swung between a closed, operative position, as shown in FIGS. 1 and 2 and an open position permitting the removal of the extruder screw 30. The division plane 6 of the wide extruder head, between the upper part 3 and lower part 5, lies on or above the upper edge of the screw 30 of the extruder. The lower part 5 of the wide extruder head carries on its inner surface a displacement body 7 which serves to spread the extrudant uniformly over the entire width of the wide extruder head. On its forward side, the lower part 5 of the wide extruder head is provided with a bearing groove 8 in which a cylindrical bead 9 on the upper edge of a lip 30 is rotatably received. The lip 10 overlies a sector of the upper roller 11 of the calender. Between this lip 10 and the upper roller 11 of the calender there is formed a gap 12 of which the gap width can be changed by adjustment of the lip 10. In the illustrated embodiment, this is achieved by adjustment of the lip 10 by means of an eccentric arrangement 13. Between the eccentric arrangement 13, which can be adjusted by means of a hand lever 14, and the lip 10 there is arranged a link 15. The eccentric arrangement 13 comprises eccentrics on a shaft 14 which is rotatably supported in projections 17 on the lower part 5 of the wide extruder head. By means of this eccentric arrangement 13 and the links 15, the lip 10 can be adjusted to provide different gap widths, so that the extruded material from the extruder 1, 7 passes through a gap of adjustable gap width before it enters the narrowest part of the roller gap between the rollers 11 and 18.

On the upper part 3 of the wide extrusion head 3, 5 there is arranged an interchangeable lip 19 which makes the roller gap between the upper part 3 of the wide extrusion head and the upper roller 11 as small as possible. This lip is secured to the upper part 3 of the wide extrusion head by screws so as to interchangeable when the distance between the extruder and the calender is altered.

The cylindrical bead 9 on the upper edge of the adjustable lip 10 is pressed into the bearing groove 8 by means of a spring leaf 20. The spring leaf 20 is secured to the lower part 5 of the wide extruder head by means of screws 21. This spring leaf 20 covers an unavoidable free space 22 to prevent the extrudant from entering such space and presses the cylindrical bead 9 of the lip 10 in the bearing groove 8.

Figure 3:
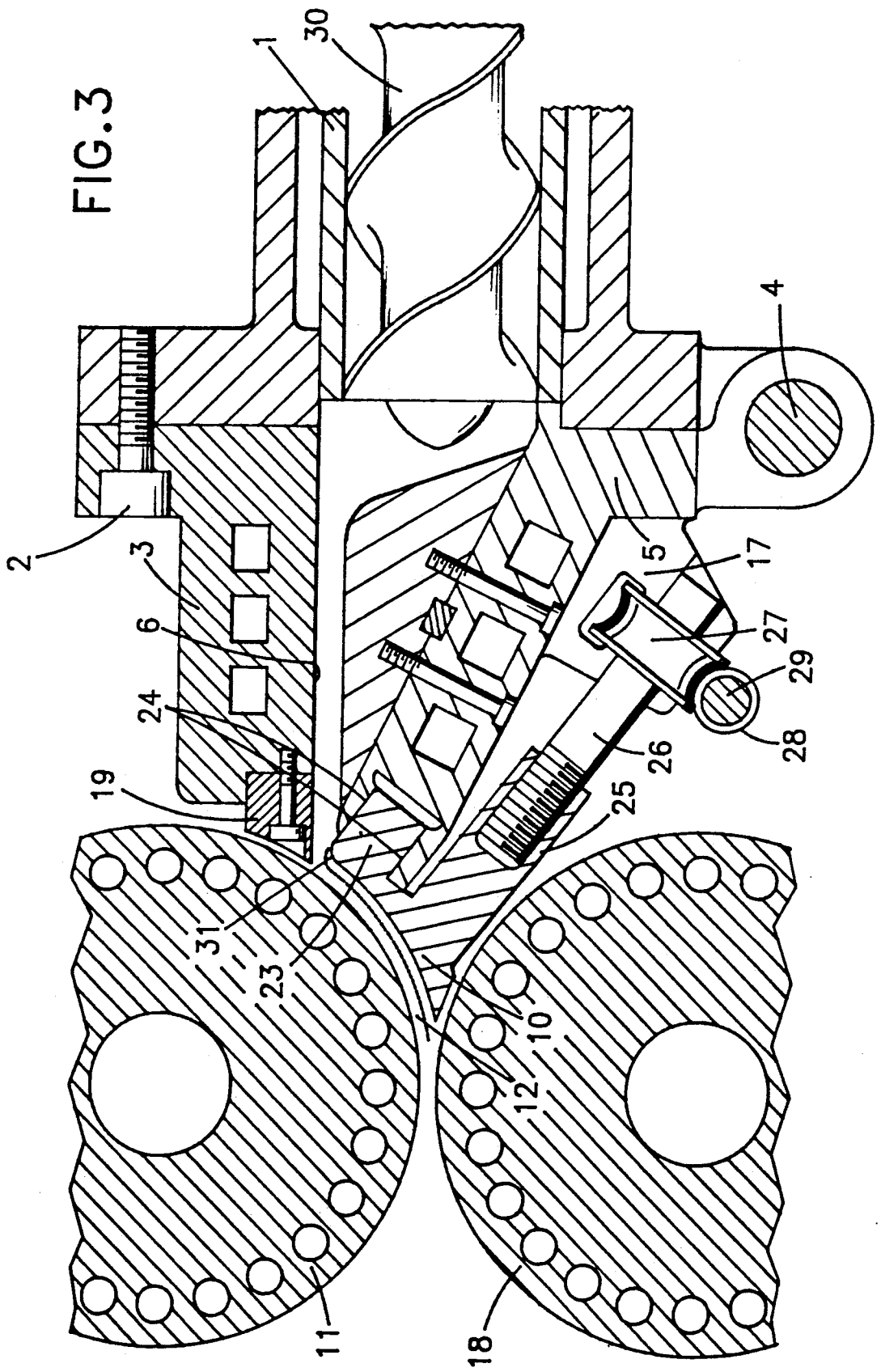
FIG. 3 is a cross-section of a forward portion of the extruder head, with a slidable lip, and adjacent calender rollers.

In FIG. 3 the lip 10 is movable parallel to itself in a direction approximately radial of the upper calender roller 11. It has on its rear side a projection 23 which is slidable in a guide 24. Also on its rear side it has a further projection 25 having a longitudinal threaded bore in which there is a threaded spindle 26 which is rotatable by a worm wheel 27 and a worm 28 on a shaft 29. Advantageously there are at least two spindles 26 and two worm drives 27-29 provided in order to move the adjustable lip 10 exactly parallel to itself and to keep the lip parallel to the axis of the upper roller 11 of the calender.

In the embodiment of FIG. 3 the lip 10 has on its upper edge a rounding 31 which serves to attain an improved flow of teh material.

What we claim is:

1. An extruder-calender combination comprising an extruder housing, a rotatable extruder screw in said housing, an extrusion head mounted on said housing and a calender positioned in front of said extruder head,
    said calender comprising a lower roller and an upper roller spaced above said lower roller to provide a roller gap between said rollers,
    said extrusion head comprising an upper part immovably mounted on said extruder housing and a lower part hingedly mounted on said housing, said upper and lower parts defining between them a flow channel directed toward said upper calender roller,
    said upper extrusion head part being disposed above said screw so that said screw may be removed from said housing upon swinging said lower extrusion head part to an open position and without removing said upper extrusion head part from said housing,
    an adjustable lip on said lower extrusion head part facing a sector of said upper calender roller and defining between said lip and said upper calender roller a variable gap through which material extruded through said flow cahnnel must pass before reaching the narrowest part of said roller gap between said calender rollers, and
    means for adjusting the location of said lip to vary the width of said variable gap between said lip and said upper calender roller.

2. An extruder-calender combination according to claim 1, in which said lip is pivotally connected on its upper edge to said lower extrusion head part.

3. An extruder-calender combination according to claim 2, in which said lip has at its upper edge by a cylindrical bead received in a cylindrical recess in said lower extrusion part.

4. An extruder-calender combination according to claim 3, further comprising a leaf secured to said lower extrusion head part and overlying said cylindrical bead of said lip.

5. An extruder-calender combination according to claim 4, in which said leaf is a spring leaf which presses said cylindrical bead in said cylindrical recess.

6. An extruder-calender combination according to claim 2, in which said adjusting means comprises means for swinging said lip about its pivot to vary the variable gap between said lip and said upper calender roller.

7. An extruder-calender combination according to claim 6, in which said swinging means comprises a rotatable shaft parallel to said lip, a plurality of eccentrics axially spaced on said shaft, a plurality of links each of which is pivotally connected at one end to said lip and has at an opposite end a bearing receiving a respective of said eccentries and means for rotating said shaft.

8. An extruder-calender combination according to claim 1, in which said lip is slidably mounted on said lower extrusion head part for movement toward and away from said upper calender roller.

9. An extruder-calender combination according to claim 8, in which said adjusting means comprises means for moving said lip toward and away from said upper calender roller.

10. An extruder-calender combination according to claim 9, in which said moving means comprises a plurality of threaded spindles spaced lengthwise of said lip and engaging complimentary threaded portions of said lip and means for rotating all of said spindles in unison with one another.

11. An extrusion-calender combination according to claim 10, in which said means for rotating all of said spindles in unison with one enother comprises a worm wheel on each of said spindles, a shaft extending parallel to said lip and having on shaft a worm meshing with each of said worm wheels and means for rotating said shaft.

12. An extruder-calender combination according to claim 8, in which an upper edge of said lip is rounded.

13. An extruder calender combination according to claim 1, further comprising an elongate member removably secured to an upper portion of said lower extrusion head part and contoured to distribute material widthwise in said extruder head.

* * * * *